United States Patent
Noske et al.

(10) Patent No.: US 7,400,361 B2
(45) Date of Patent: Jul. 15, 2008

(54) METHOD AND DEVICE FOR GENERATING A VIDEO EFFECT

(75) Inventors: Reiner Noske, Darmstadt (DE); Claus-Bernhard Reichenbach, Griesheim (DE)

(73) Assignee: Thomson Licensing, Boulogne-Billancourt (FR)

( * ) Notice: Subject to any disclaimer, the term of this patent is extended or adjusted under 35 U.S.C. 154(b) by 446 days.

(21) Appl. No.: 10/655,472

(22) Filed: Sep. 4, 2003

(65) Prior Publication Data

US 2004/0052503 A1    Mar. 18, 2004

(30) Foreign Application Priority Data

Sep. 13, 2002    (DE)    ................ 102 42 755

(51) Int. Cl.
*H04N 9/74*    (2006.01)
(52) U.S. Cl. .................. 348/578; 348/584; 348/586; 348/598
(58) Field of Classification Search ......... 348/578–584, 348/590
See application file for complete search history.

(56) References Cited

U.S. PATENT DOCUMENTS

| | | |
|---|---|---|
| 3,928,717 A | 12/1975 | Dorland |
| 3,969,972 A | 7/1976 | Bryant |
| 4,378,466 A | 3/1983 | Esser |
| 4,764,809 A | 8/1988 | Haycock et al. |
| 4,768,086 A | 8/1988 | Paist |
| 5,048,390 A | 9/1991 | Adachi et al. |
| 5,151,793 A | 9/1992 | Ito et al. |
| 5,646,931 A * | 7/1997 | Terasaki ................. 369/124.08 |
| 5,696,849 A * | 12/1997 | Blackham ................... 382/260 |
| 5,966,129 A * | 10/1999 | Matsukuma et al. ........ 345/418 |
| 6,067,126 A * | 5/2000 | Alexander ................... 348/738 |
| 6,072,933 A * | 6/2000 | Green .......................... 386/46 |
| 6,183,367 B1 * | 2/2001 | Kaji et al. ...................... 463/42 |
| 6,369,835 B1 * | 4/2002 | Lin ............................. 715/726 |
| 6,378,132 B1 * | 4/2002 | Grandin et al. ............. 725/146 |
| 6,686,970 B1 * | 2/2004 | Windle ........................ 348/584 |

FOREIGN PATENT DOCUMENTS

| | | |
|---|---|---|
| DE | 3816545 A1 | 11/1989 |
| DE | 4114440 A1 | 11/1992 |
| DE | 19503411 C1 | 1/1996 |
| EP | 0327333 B1 | 2/1989 |
| EP | 1025890 A2 | 1/2000 |
| GB | 2348762 | 10/2000 |
| GB | 2349023 | 10/2000 |
| JP | 7131706 | 5/1995 |
| WO | 9422128 | 9/1994 |
| WO | 9926412 | 5/1999 |

* cited by examiner

*Primary Examiner*—Brian P. Yenke
(74) *Attorney, Agent, or Firm*—Joseph J. Laks; Robert B. Levy; Jorge Tony Villabon

(57) ABSTRACT

A method for generating a video effect using a video signal processing device. The method comprises generating horizontal and vertical gating base signals. The horizontal gating base signal is combined with a first modulation signal and the vertical gating base signal is combined with a second modulation signal. An amplitude distribution is generated from the modulated horizontal and vertical gating base signals. A control signal is generated from the amplitude distribution for controlling a mixing stage. A third modulation signal is derived from a sound signal for modulating the control signal.

10 Claims, 6 Drawing Sheets

(a)     (b)     (c)

US 7,400,361 B2

METHOD AND DEVICE FOR GENERATING A VIDEO EFFECT

This application claims the benefit, under 35 U.S.C. 119, of German patent application No. 10242755.0 filed Sep. 13, 2002.

FIELD OF THE INVENTION

The invention relates to a method for generating a video effect using a video signal processing device, in particular a method as described in claim 1. Furthermore, the invention relates to a device for generating a video effect.

BACKGROUND OF THE INVENTION

A central part of the production of television broadcasts or the post processing of film material is video signal processing. The term video signal processing hereinafter denotes the switching and distribution of video signals from various sources such as, for example, television cameras or video recording apparatuses. Furthermore, the term denotes the combination of a plurality of signals by mixing, for it is also to be understood to mean the editing of recorded video material. For these purposes, production mixers and digital video effect apparatuses are predominantly used as the video signal processing device in production studios. The video processing apparatuses are used to generate a video output signal from a video input signal or from a plurality of video input signals in a controlled manner. In this case, a very significant part is played by trick generators for generating mixing effects. By virtue of the consistent use of large scale integrated components, modern mixers exhibit a plurality of independent mixing effect stages which can be used to represent diverse trick effects.

Mixers constructed in this way enable not only standard tricks such as rectangle, circle, fan, but also matrix tricks, NAM combination ("non additive mixing") of two channels per trick generator, MIX combination (metamorphosis) and also special forms such as star, spiral, flower, fractals, and much more besides.

Despite all the diversity of tricks which can be realized in this way, their dynamic range is nonetheless restricted to mathematical manipulations of the underlying trick figures.

In addition to the mixing effects mentioned in the introduction, which are based on a modulation of the gating signals, EP 0 327 333 B1 proposes a further mixing effect based on an additional control signal being fed to the background color generator. The control signal is derived from the gating signal and effects a color transition from one side of the screen to the other.

SUMMARY OF THE INVENTION

Taking this as a departure point, it is desirable to provide a method for generating a video effect, and also a device for carrying out the method, by means of which video effects and picture background structures and colors can be varied to a greater extent than has been the case hitherto.

This invention is based on the concept of modulating trick figures, background colors or background structures with an additional signal.

The invention's method for generating a video effect using a video signal processing device comprises the following steps:

a) generation of a horizontal and a vertical gating base signal,
b) combination of the horizontal gating base signal with a first modulation signal,
c) combination of the vertical gating base signal with a second modulation signal, and
d) generation of an amplitude distribution from the modulated horizontal and vertical gating base signals, and
e) generation of a control signal from the amplitude distribution for controlling a mixing stage. According to the invention, the method is characterized by the fact that a third modulation signal is derived from a sound signal, and that the control signal is modulated with the third modulation signal. In this way, it is possible to impart to the control signal a dynamic range which cannot be represented by conventional methods. Particularly when the sound signal is music, the control signal is imparted a rhythmic dynamic range which opens up new possibilities of picture configuration.

The sound signal is expediently separated from a reception signal comprising both a video signal and the sound signal. This has the advantage that the relationship between the sound signal and the picture signal also influences the picture configuration in the mixing stage.

From the standpoint of circuitry outlay, it may be advantageous to generate a composite modulation signal from the sound signal and the first and/or the second modulation signal.

In a refinement of the method according to the invention, it is possible to modulate a background color signal with the sound signal, thereby achieving additional configuration effects. In addition to the modulation of the texture of a background, caused by the modulation of the gating base signals, the modulation of the background color signal furthermore also modulates the hue of the background in the area. Additional configuration possibilities for mixing effects are thus opened up to a user.

In a further modification, the background color signal is modulated with the control signal for the mixing stage. The control signal itself is a function of the modulated horizontal and vertical gating base signals and of the sound signal. This gives rise to a different modulation of the background color signal than in the case of a modulation by the sound signal alone. One advantage for the user of this is that yet another configuration possibility for mixing effects is available to him.

According to the invention, the device for generating a video effect is provided with a generator for generating a horizontal and a vertical gating base signal,
with means for modulating the gating base signals,
with means for generating a control signal from the modulated gating base signals, and
with a mixing effect stage controlled by the control signal.

According to the invention, the device is characterized by the fact that a sound signal processing stage is provided, which derives a third modulation signal from a sound signal and feeds it to the modulation means in order to modulate the gating base signal with the third modulation signal. The device is suitable for being used to execute the method in accordance with the first aspect of the invention.

A modification of the device according to the invention has a background color generator to which is fed the third modulation signal and/or the control signal for the modulation of the color signal.

Furthermore, the device may comprise a plurality of cascaded mixing effect stages. As a result, it is possible to use the output signals of mixing effect stages as input signals of mixing effect stages connected downstream and to produce more complicated mixing effects in this way.

Finally, in one embodiment of the device, a sound signal separation stage may be provided, which separates the sound signal from an overall signal comprising the sound signal and a video signal.

The device may expediently have a filter bank which comprises various selectable filter types for processing the sound signal.

BRIEF DESCRIPTION OF THE DRAWINGS

The method according to the invention and the device according to the invention are illustrated in the drawing, in which.

DETAILED DESCRIPTION OF PREFERRED EMBODIMENTS

Known trick generators provide not only the standard effects such as edge modulation and rotation but also more complicated effects such as radial multiplication, multiple and stretch function. The term "multiple" designates the multiplication of a trick figure in a picture.

Figure 1:
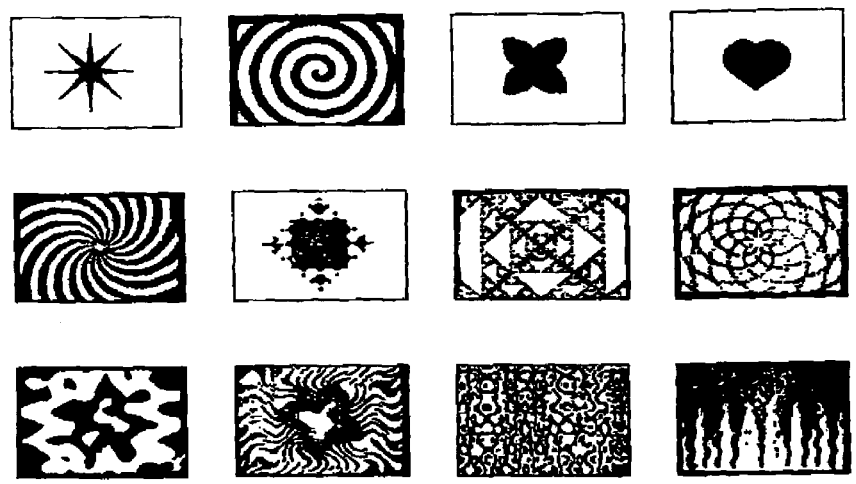
FIG. 1 shows a selection of mixing effects as are known in the prior art.

Existing adjusters give rise, in addition to the original purpose of momentary picture change, to diverse possibilities of active background configuration with fixed and also moving patterns. Examples of such background patterns are shown in FIG. 1.

In trick generators, it is possible to differentiate between the generation of the basic tricks and the modifiers thereof. Rectangle, circle, fan and matrix are provided as basic tricks. The diverse adjusting possibilities of the modifiers result in a very large number of different trick forms which the user can also store.

Figure 2:
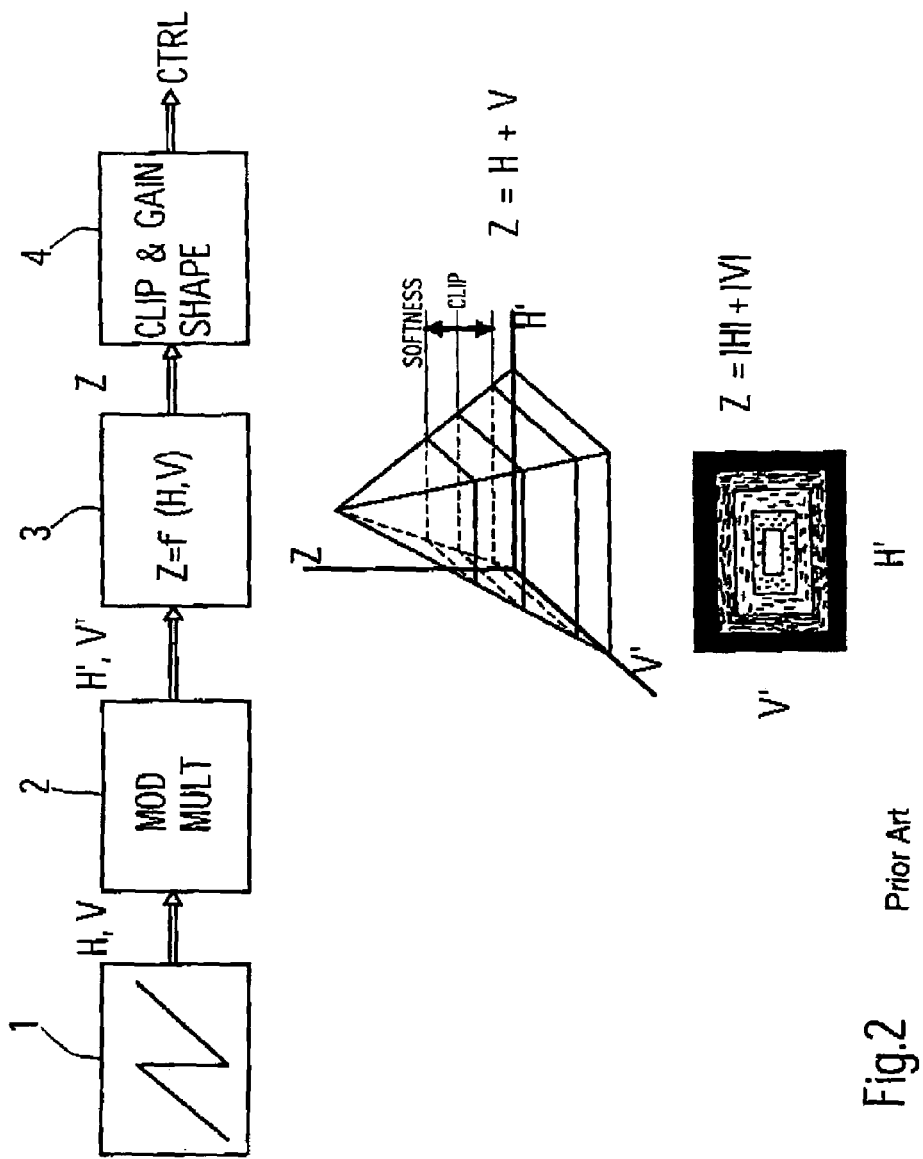
FIG. 2 shows a block diagram illustrating the generation of mixing effects.

The basic principle of trick generation is illustrated in FIG. 2. A horizontal and a vertical sawtooth signal H, V are generated in a sawtooth generator 1. The sawtooth signals form gating base signals from which a control signal for a mixing effect stage is derived, as described below. The control signal for a mixing effect stage is often also referred to as a gating signal. The horizontal sawtooth signal H normally has a frequency which corresponds to the line frequency of 15 kHz, for example. The vertical sawtooth signal V normally has a frequency which corresponds to the frame or field repetition frequency of 25 Hz or 50 Hz, for example. The sawtooth signals are modulated and/or multiplied, as required, in a preprocessing stage 2. An amplitude distribution Z=f (H, V), which has a specific form depending on the trick chosen, is generated in a processing stage 3. FIG. 2 illustrates the amplitude distribution for the rectangle trick. The control signal for the cross-fading stages is obtained by clipping a signal component. By changing the gain, it is possible to set the rise time of the control signal and thus the so-called "softness" within wide limits. A decreasing softness leads to an increasingly harder picture transition.

Modifications such as rotation, multiplication, mirroring and edge modulation can be performed in the preprocessing stage 2. Equally, it is possible to arbitrarily change the aspect ratio of the trick in the horizontal and vertical directions.

Furthermore, a stretch function is provided, by means of which a trick can be stretched horizontally and vertically. In vivid terms, the horizontal and vertical edges of the trick representation are extended like a rubber band. Therefore, in the case of the rectangle trick, for example, the aspect ratio can be changed without affecting the edge softness set.

The principle of the modifiers of a basic trick is explained below using a few examples.

The rotation of a trick about the origin is achieved by means of a coordinate transformation by an angle φ.

$$H'=H*\cos(\phi)+V*\sin(\phi)$$

$$V'=-H*\sin(\phi)+V*\cos(\phi)$$

Furthermore, the height-to-width ratio of the trick can be altered arbitrarily by weighting the primary sawtooth signals H and V.

Figure 3:
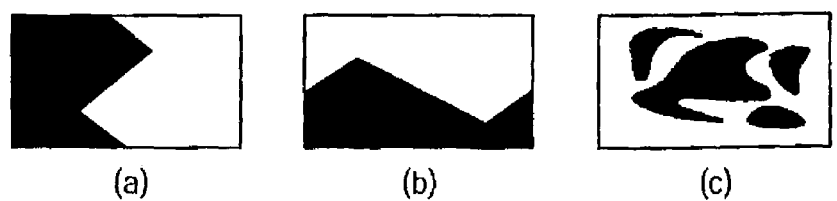
FIGS. 3a to 3c show examples of modulated trick edges.

Through superposition of a line or pixel offset, it is possible to achieve a modulation of the trick edge in a two-dimensional direction. An example of a vertical modulation is shown in FIG. 3a, while a horizontal modulation is illustrated in FIG. 3b.

In addition to the selection of different modulation signal shapes, it is possible to set parameters such as frequency, amplitude, phase and speed from the operating unit. Through a low frequency and speed, it is possible to generate, for example, "flying leaves" and "bubbles", as are illustrated in FIG. 3c. Such a trick effect is particularly well suited to background configuration.

Figure 4:
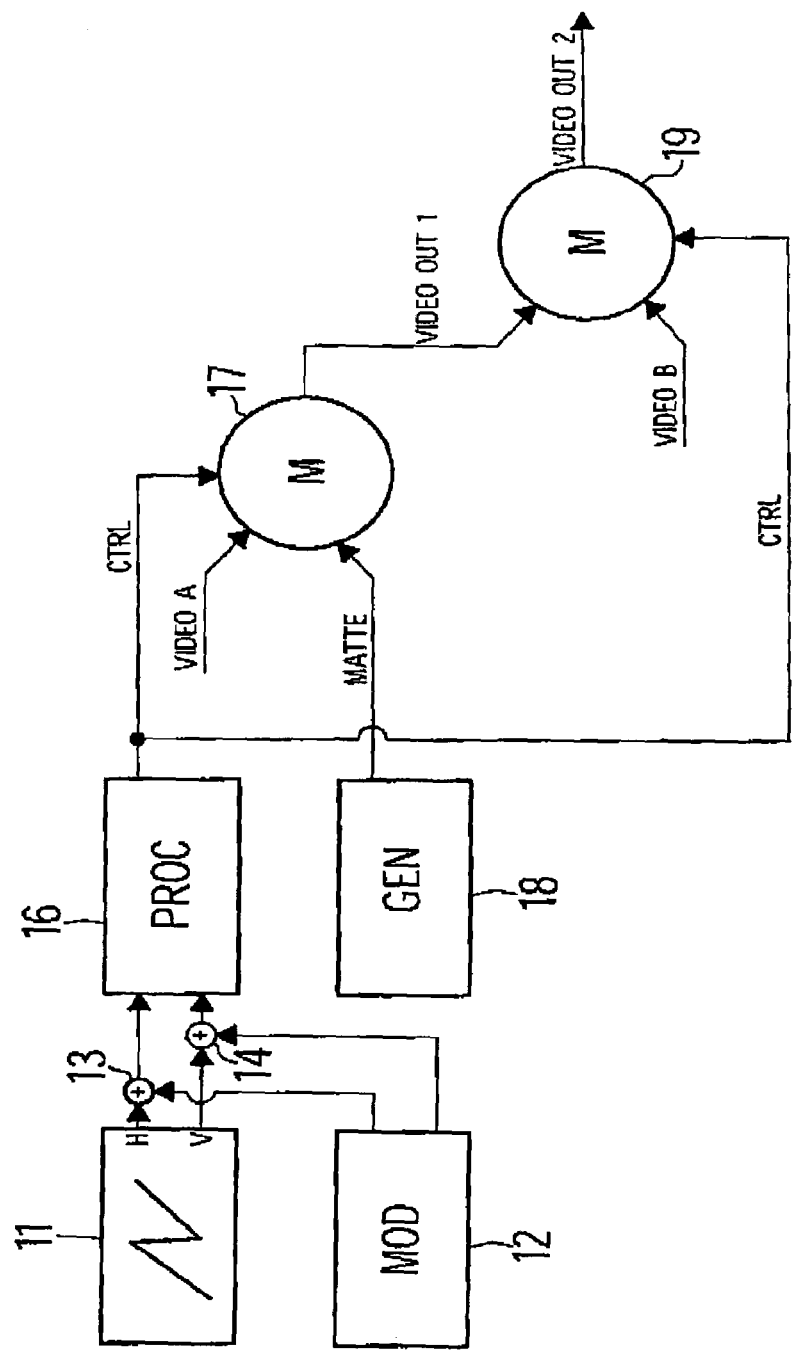
FIG. 4 shows a schematic block diagram of a video signal processing device with two mixing effect stages.

FIG. 4 illustrates a schematic block diagram of a video signal processing device which is suitable for generating the known and above-described mixing effects. The device comprises a generator 11 for generating horizontal and vertical sawtooth signals H, V as gating base signals. The horizontal sawtooth signal normally has a frequency which corresponds to the line frequency, for example 15 kHz. The vertical sawtooth signal normally has a frequency which corresponds to the frame or field repetition frequency, for example 25 Hz or 50 Hz. The generator 11 furthermore also has means which, in a known manner, optionally effect a multiplication and/or mirroring of the horizontal and vertical sawtooth signals. A further generator 12 generates first and second modulation signals such as, for example, sine, triangular and rectangular functions. In combination stages 13 and 14, the horizontal and vertical gating base signals are combined with modulation signals from the generator 12 and fed to a processing stage 16. The processing stage 16 generates an amplitude distribution which is fed as control signal to a first mixing effect stage 17. Furthermore, a background color signal generator 18 is provided, whose output signal MATTE is likewise fed to the mixing effect stage 17. The mixing stage 17 receives a video signal VIDEO A as a further input signal. From these input signals, the mixing effect stage 17 generates an output signal VIDEO OUT 1, which forms an input signal for a second mixing effect stage 19. The mixing effect stage 19 receives a video signal VIDEO B and the control signal CTRL as further input signals. From these signals, the mixing effect stage 19 generates an output signal VIDEO OUT 2, which may contain the mixing effects illustrated in FIG. 1.

Figure 5:
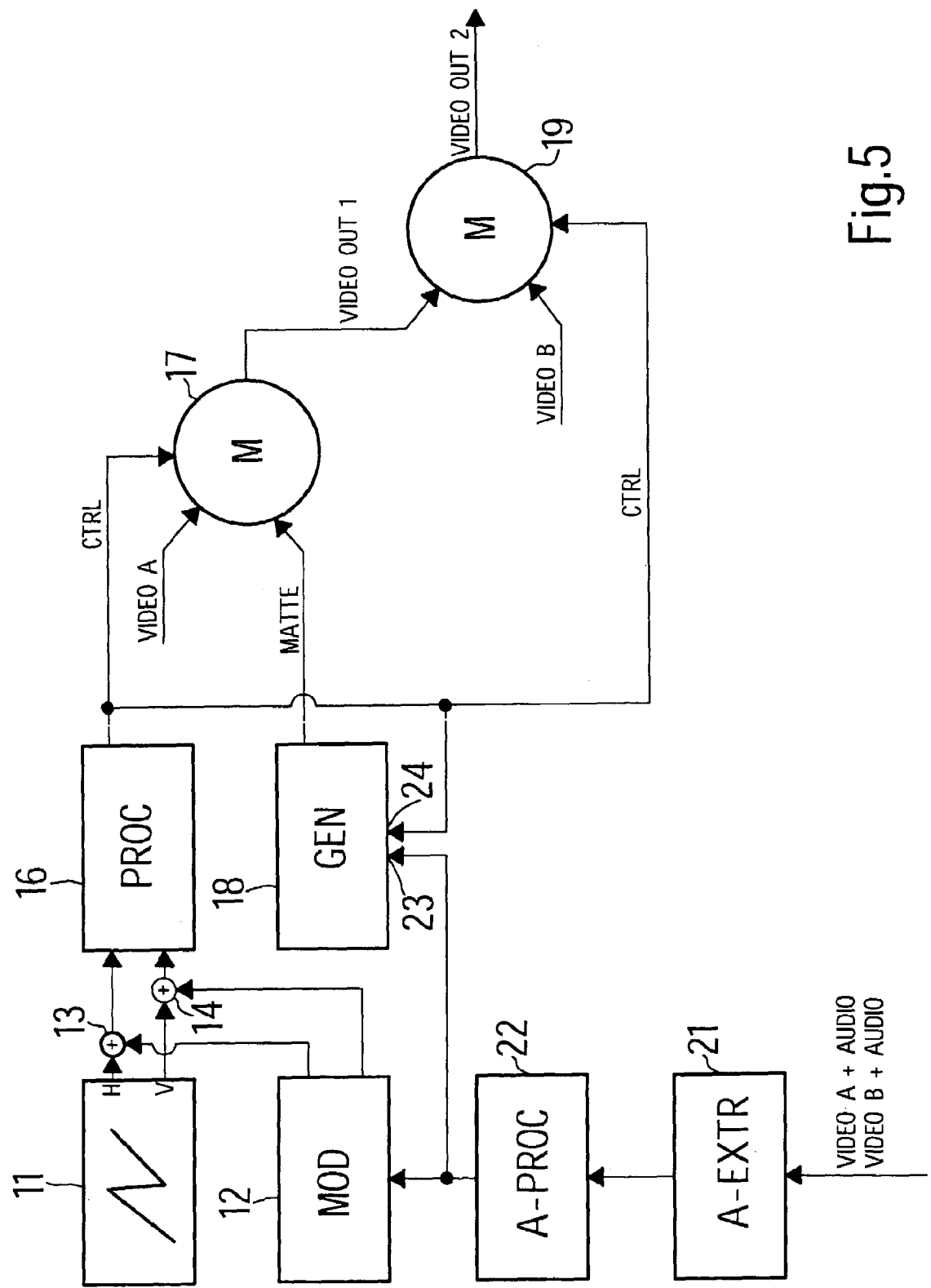
FIG. 5 shows a schematic block diagram of a video signal processing device according to the invention.

FIG. 5 shows a schematic block diagram of a video signal processing device which is suitable for generating the mixer effects according to the invention. For the sake of brevity, identical or mutually corresponding components of the devices from FIGS. 4 and 5 are designated by the same reference symbols. With regard to the function of these components, reference is made to the description of FIG. 4. As can be seen from a comparison between FIG. 4 and FIG. 5, the device according to the invention as illustrated in FIG. 5 differs by virtue of an audio separation stage 21, which separates the audio signal from a composite signal containing both a video signal and an audio signal. The video signal may be both the signal VIDEO A and the signal VIDEO B. Means not illustrated in FIG. 5 are provided which enable a user to make a selection between one signal and the other. The separated audio signal forms an input signal for an audio processing stage 22, the output signal of which forms a third modulation signal and is fed to the generator 12. In the generator 12, the first and/or second modulation signal is combined with the third modulation signal. The third modulation signal normally comprises only specific frequency components derived from an audio signal. The frequency components can be chosen through corresponding settings on the audio processing stage 22. The audio processing stage 22 is also provided with means for multiplying the frequency of signals or for processing the latter in other ways in order to achieve desired effects.

The generator 12 has counters which generate the horizontal and vertical sawtooth signals. The counters drive so-called look-up tables. The weighting of the drive level can be performed variably in accordance with the look-up tables. The weighting is embodied by means of multipliers M1, M2 and scale factors G1, G2. The modulation signals generated by superposition in this way are output by the generator 12 to the combination stages 13 and 14, where they are combined with the horizontal and vertical gating base signals H, V in the manner described in connection with FIG. 4. A gating signal modulated with the third modulation signal is thus produced and is fed as control signal to the first mixing effect stage 17 and the second mixing effect stage 19. In this way, it is possible to generate mixing effects which have a rhythmic dynamic range because the third modulation signal is derived from an audio signal.

A further difference between the device according to the invention and the known video signal processing device illustrated in FIG. 4 is two control inputs 23 and 24 to the background color signal generator 18. The control signal input 23 is fed the processed audio signal which effects a modulation of the background color signal in the area. By contrast, the gating signal or control signal fed to the mixing effect stages 17 and 19 is present at the second control signal input 24. This signal makes it possible, for example, to alter the hue of the background color from one side of the screen toward the other side. Means not illustrated in FIG. 5 enable the user of the device to select one or the other type of modulation of the background color.

Figure 6:
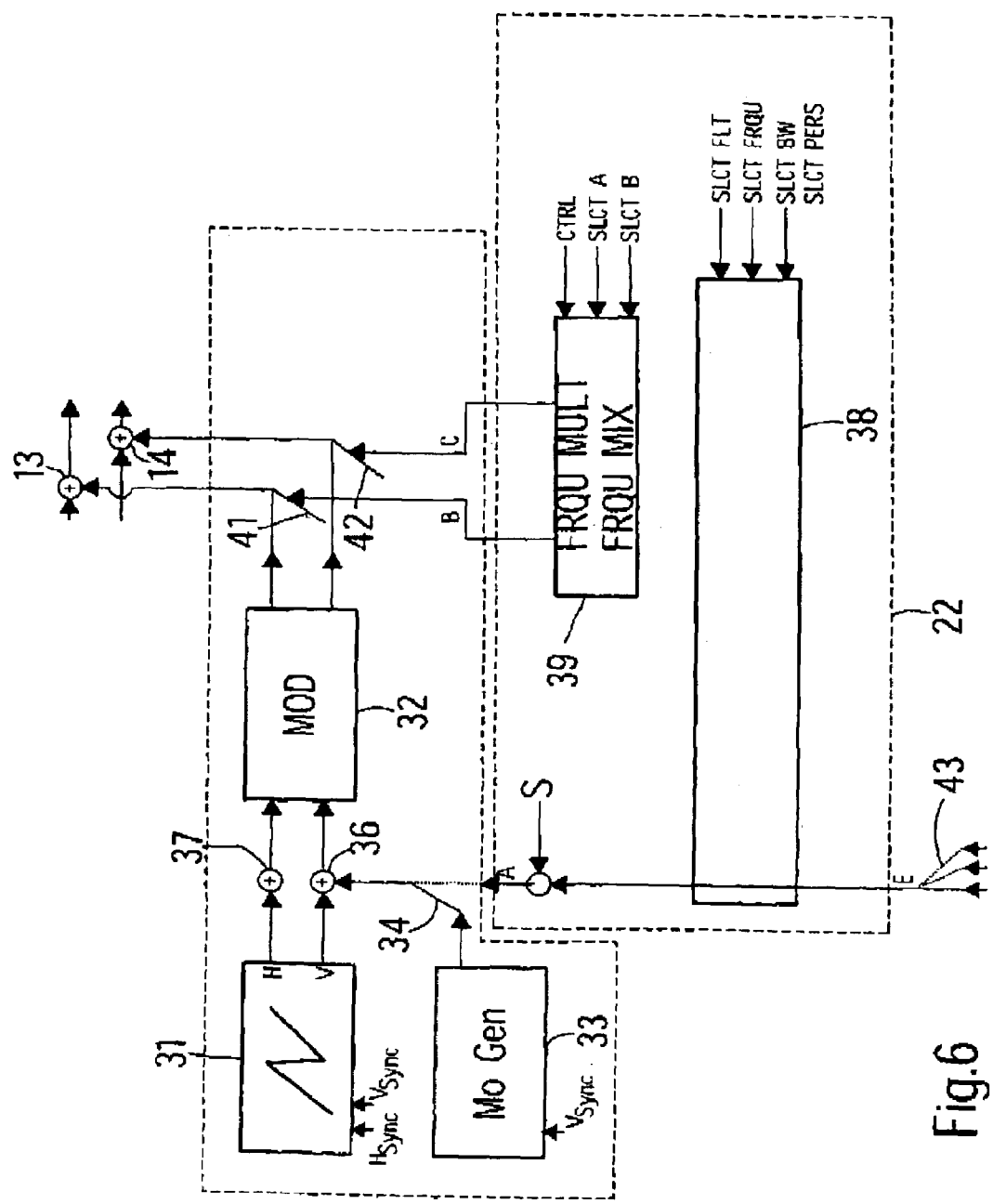
FIG. 6 shows the generator and the audio signal processing stage from FIG. 5 in greater detail.
Figure 7:
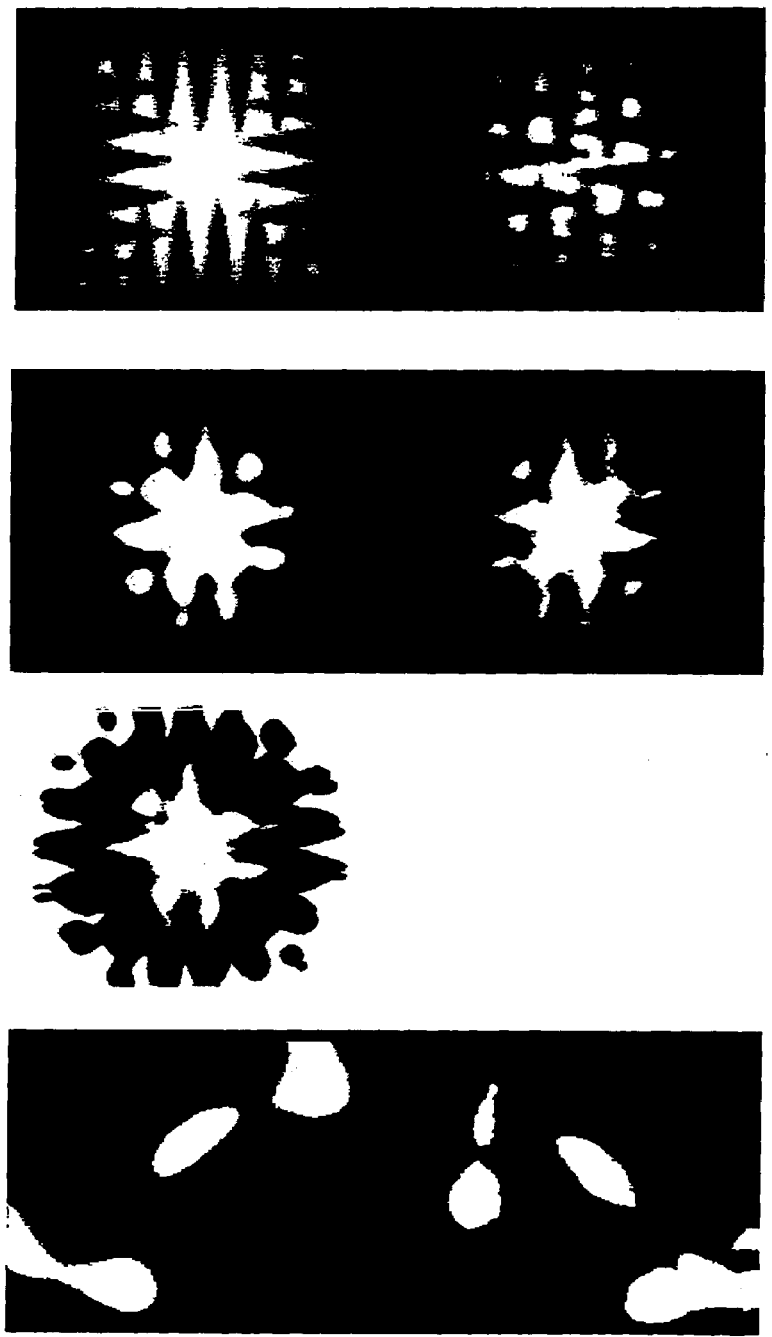
FIG. 7 shows examples of mixing effects which can be generated by means of the device according to the invention.

FIG. 6 illustrates the components of the generator 12 and of the audio processing stage 22 in greater detail. The generator 12 comprises a sawtooth or address generator 31, whose horizontal- and vertical-frequency output signals drive a function block 32. The function block 32 outputs values from tables (look-up tables) or function values which are fed as the first and second modulation signals to the addition stages 13 and 14 (also see FIG. 5). Furthermore, a motion generator 33 is provided, which generates an offset signal which varies at a rate which is less than the vertical frequency. By means of a switch 34, the offset signal can be superposed on the output signals of the sawtooth generator 31 by means of addition stages 36, 37.

The audio processing stage 22 has a filter bank 38. The filter bank 38 contains a number of different filters, such as, for example, low-pass, high-pass and bandpass filters, and also a driving filter which integrates the amplitude dynamic range of the audio signal. The different filters and their characteristics (e.g. center frequency, bandwidth) can be selected by means of control signals SLCT FLT, SLCT PERS, SLCT FRQU and SLCT BW.

Very low-frequency signal components can be scaled with a scale factor G3 before they serve as input signal for the addition stages 36, 37. A further multiplier M3 is provided for this purpose.

The audio processing stage 22 furthermore has a processing stage 39, which serves for frequency multiplication and frequency mixing of the audio signals. The output signals of the processing stage 39 can be fed to the addition stages 13, 14 via switches 41, 42 as an alternative to the output signals of the function block 32. Multipliers M4, M5 are arranged in the signal paths in order to scale the output signals of the processing stage 39 with scale factors G4, G5.

Finally, the input signals for the audio signal processing stage 22 can be selected from different audio sources by means of a switch 43.

By means of the modulation signals generated in the generator 12 and the third modulation signal, derived from a sound signal, it is possible to generate a multiplicity of trick patterns that have not been achieved heretofore. Hitherto unavailable configuration possibilities are thus opened up to the user. For illustration purposes, a few exemplary trick patterns are represented for this in FIG. 6. It is emphasized that the trick patterns shown are only a small selection of the trick patterns that can actually be generated.

What is claimed is:

1. A method for generating a video effect using a video signal processing device, comprising the following steps:
   a) generating a horizontal and a vertical gating base signal,
   b) combining the horizontal gating base signal with a first modulation signal,
   c) combining the vertical gating base signal with a second modulation signal,
   d) generating an amplitude distribution from the modulated horizontal and vertical gating base signals, and
   e) generating a control signal from the amplitude distribution for controlling a mixing stage,
   f) deriving a third modulation signal from a sound signal, and
   g) modulating the control signal with the third modulation signal.

2. The method as claimed in claim 1, further comprising;
   separating the sound signal from a reception signal comprising both a video signal and the sound signal.

3. The method as claimed in claim 1, further comprising;
   generating a composite modulation signal from the first and/or the second and/or the third modulation signal.

4. The method as claimed in claim 1, further comprising;
   modulating a background color signal with the third modulation signal.

5. The method as claimed in claim 1, further comprising;
   modulating a background color signal with the control signal.

6. A device for generating a video effect having a generator for generating a horizontal and a vertical gating base signal, comprising;

means for modulating the gating base signals with a first and respectively a second modulation signal, means for generating a control signal from the modulated gating base signals, a mixing effect stage controlled by the control signal, wherein a sound signal processing stage is provided, which derives a third modulation signal from a sound signal and feeds it to the modulation means in order to modulate the gating base signal with the third modulation signal.

7. The device as claimed in claim 6, wherein the device has a background color generator for generating a background color signal, to which is fed the third modulation signal and/or the control signal for the modulation of the background color signal.

8. The device as claimed in claim 6, wherein the device comprises a plurality of cascaded mixing effect stages.

9. The device as claimed in claim 6, wherein a sound signal separation stage is provided, which separates the sound signal from an overall signal comprising the sound signal and a video signal.

10. The device as claimed in claim 6, wherein a filter bank is provided, which comprises various selectable filter types for processing the sound signal.

* * * * *